(12) United States Patent
Yazawa et al.

(10) Patent No.: US 8,732,715 B2
(45) Date of Patent: May 20, 2014

(54) RESOURCE MANAGEMENT METHOD, DEVICE AND PROGRAM THEREOF

(75) Inventors: Hiroshi Yazawa, Kawasaki (JP);
Takashi Fujiwara, Kawasaki (JP);
Miyuki Tomikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 2363 days.

(21) Appl. No.: 10/996,839

(22) Filed: Nov. 24, 2004

(65) Prior Publication Data
US 2006/0048159 A1     Mar. 2, 2006

(30) Foreign Application Priority Data
Aug. 30, 2004  (JP) ................................ 2004-251022

(51) Int. Cl.
*G06F 9/46*     (2006.01)
(52) U.S. Cl.
USPC ......................................................... 718/104
(58) Field of Classification Search
None
See application file for complete search history.

(56) References Cited

U.S. PATENT DOCUMENTS

| | | | |
|---|---|---|---|
| 6,314,463 B1 * | 11/2001 | Abbott et al. ................. | 709/224 |
| 7,552,437 B2 * | 6/2009 | Di Luoffo et al. ............ | 718/104 |
| 7,565,655 B2 * | 7/2009 | Diao et al. .................... | 718/104 |
| 2002/0031214 A1 * | 3/2002 | Cowan ...................... | 379/221.09 |
| 2002/0169825 A1 * | 11/2002 | Hougland et al. ............ | 709/203 |
| 2005/0283481 A1 | 12/2005 | Resenbach et al. | |

FOREIGN PATENT DOCUMENTS

| | | |
|---|---|---|
| JP | A 3-294931 | 12/1991 |
| JP | 2002-082965 | 3/2002 |
| JP | A 2002-279011 | 9/2002 |
| JP | A 2003-208413 | 7/2003 |
| JP | A 2006-504177 | 2/2006 |
| WO | WO 2004/038588 A2 | 5/2004 |

OTHER PUBLICATIONS

Junji Yasui, et al., "Supervisory, Control and Data Acquisition and Fundamental Technology," NEC Technical Journal, Kabushiki Kaisha NEC Creative, Nov. 25, 1998, vol. 51, No. 11, pp. 56-63.

* cited by examiner

*Primary Examiner* — Mengyao Zhe
(74) *Attorney, Agent, or Firm* — Greer Burns & Crain Ltd.

(57) ABSTRACT

There are resource managers provided for various kinds of resources including hardware and software, and a system resource manager that manages the entire system including the resource managers. Configuration management of the system resource manager grasps the system configuration by XML-based definition information and detects a control method of each of the resources. Accepting an operation instruction to a resource, the system resource manager specifies a target resource to be controlled under configuration management and sends an event to a resource manager that manages the target resource by event control. The resource manager that receives the event specifies the target resource to be controlled under configuration management and sends a control instruction to the target resource by event control to operate the target resource.

4 Claims, 7 Drawing Sheets

```
<Components>
  <Hardwares>
    <Server name="psvr1" id="psvr001" vender="Fujitsu"
                                       model="PRIMEPOWER 900" >
      <Actions>
        <Action url="file://mgr/st1/start.sh" type="start" />
        <Action url="file://mgr/st1/stop.sh"  type="stop" />
        <Action url="file://mgr/st1/setconf.sh" type="configure" />
      </Actions>
      <Configuration>
        <Cpu id="cpu001" type="SPARC64V" clockRate="1.35" />
           :
      </Configuration>
         :
    </Server>
     :
  </Hardwares>
</Components>
```

FIG. 2

```
<Components>
  <Hardwares>
    <Server name="psvr1" id="psvr001" vender="Fujitsu"
                                          model="PRIMEPOWER 900" >
      <Actions>
        <Action url="file://mgr/st1/start.sh" type="start" />
        <Action url="file://mgr/st1/stop.sh"  type="stop" />
        <Action url="file://mgr/st1/setconf.sh" type="configure" />
      </Actions>
      <Configuration>
        <Cpu id="cpu001" type="SPARC64V" clockRate="1.35" />
              :
      </Configuration>
              :
    </Server>
              :
  </Hardwares>
</Components>
```

FIG. 3

```
<Components>
  <Hardwares>
    <Server name="psvr1" id="psvr001" vender="Fujitsu"
                                              model="PRIMEPOWER 900" >
            :
      <Actions>
        <Action url="file://mgr/cpu/start.sh" type="start" />
        <Action url="file://mgr/cpu/stop.sh"  type="stop" />
        <Action url="file://mgr/cpu/cpuconf.sh" type="configure" />
      </Actions>
      <Configuration>
            :
        <Cpu id=cpu001 type="SPARC64V" clockRate="1.35" />
        <Cpu id=cpu002 type="SPARC64V" clockRate="1.35" />
        <Cpu id=cpu003 type="SPARC64V" clockRate="1.35" />
        <Cpu id=cpu004 type="SPARC64V" clockRate="1.35" />
            :
      </Configuration>
            :
    </Server>
            :
  </Hardwares>
</Components>
<Logical Views>
  <Server name="lp001" Linkid="psvr001">
            :
    <Configuration>
      <Cpu id="lcpu001 Linkid="cpu001" />
      <Cpu id="lcpu002 LinkId="cpu002" />
            :
    </Configuration>
            :
</Logical Views>
```

FIG. 4

```
<Components>
  <Softwares>
     :
    <Middlewares>
      <Middleware name="Interstage AS EE" id="mw01" vender="Fujitsu">
         :
        <Actions>
          <Action url="file://mgr/app1/start.sh" type="start" />   ...... (0-1)
          <Action url="file://mgr/app1/stop.sh"  type="stop" />
          <Action url="file://mgr/app1/setappconf.sh"
                                        type="configure" />   ...... (0-2)
        </Actions>
         :
      </Middleware>
       :
    </Middlewares>
     :
  </Softwares>
</Components>
<Logical Views>
  <Services>
    <Service name="App" id="app01">
       :
      <RequiredSoftware>
         :
        <SoftwareRef type="Middleware" LinkId="mw01" />   ...... (0-1)'
         :
      </RequiredSoftware>
       :
      <Configuration>
         :
        <define name="clientname" value="node01" />   ...... (0-1)'
        <define name="clientname" value="node02" />   ...... (0-1)'
         :
      </Configuration>
       :
    </Service>
     :
  </Services>
</Logical Views>
```

RESOURCE MANAGEMENT METHOD, DEVICE AND PROGRAM THEREOF

BACKGROUND OF THE INVENTION

1. Field of the Invention

The present invention relates to method and device for managing hardware and software, which constitute a system, as logic information (resource). Particularly, the present invention relates to resource management method, device and program thereof to manage various resources as a single unit without using original configuration definitions for the respective resources.

2. Prior Art

A method to manage a computer system that consists of pieces of hardware and software has been known. For example, the claim 1 of Japanese unexamined patent publication No. 2002-82965 discloses a manager (a resource manager) that is provided with a management scenario sending means for sending a management scenario in which management operations are described to a management object node as a management object.

However, in conventional management methods including the above-mentioned publication, since configuration definitions and control methods vary from one resource to another and each of the resource managers implements its original resource control mechanism, it is necessary to add resource definitions according to the definition methods of the respective resource managers and to update by installing corresponding programs to the resource managers when new hardware or software (referred to as a resource, in the following description) is added and managed by the resource managers. Therefore, there is a problem that the management cost becomes large.

Further, since the respective resources have their original configuration definitions, the configuration management becomes more complicated as a number of the resources increases, which increases difficulty in grasping the entire system configuration.

Still further, when the resource managers that have different management methods manage a resource, the resource managers that support the resource can manage the resource, while the resource managers that do not support the resource cannot manage the resource. Since a bridge program between a vendor's original resource controller and a system must be developed to manage a resource delivered by another vendor by a resource manager, the bridge programs must be developed for the respective resource managers when the system uses the resource managers having different management methods.

SUMMARY OF THE INVENTION

It is therefore an object of the present invention to provide resource management method and device, which is capable of adding a new resource without updating a resource manager, and grasping the entire system configuration even if the system includes many resources.

A resource management method of the present invention includes steps of setting a resource manager for each of various resources including hardware and software; setting a system resource manager for managing the entire system including the resource manager; grasping the system configuration and finding control methods for the respective resources by a configuration management of the system resource manager based on XML-based definition information; specifying the resource that is necessary to be controlled by a configuration management when the system resource manager receives an operation instruction to the respective resources; sending an event to a resource manager that manages the target resource by event control; specifying a target resource to be controlled under configuration management by the resource managers that receive the event; and sending a control instruction to the target resource by event control to operate the target resource.

Further, the definition information of the resource is preferably managed with separating into physical information and logic information.

Still further, a control method for the resource may be logically managed. In such a case, the resource may be managed by three control keys including a "Start" key, a "Stop" key and a "Configure" key, for example. It is preferable that the relationship between a logic control method (a control key) and an actual call interface is defined as an XML-based control definition information.

In addition, the resource management device and the resource management program of the present invention includes resource managers provided for various kinds of resources including hardware and software and a system resource manager that manages the entire system including the resource managers. Configuration management of the system resource manager grasps the system configuration by XML-based definition information and detects a control method of each of the resources. Accepting an operation instruction to a resource, the system resource manager specifies a target resource to be controlled under configuration management and sends an event to a resource manager that manages the target resource by event control. The resource manager that receives the event specifies the target resource to be controlled under configuration management and sends a control instruction to the target resource by event control to operate the target resource.

According to the resource management method, device and program of the present invention, since the definition information is described in the XML-based text and the respective resource manager manages the resource based on the definition information, an addition of new resource to the system does not need update of the software in the resource manager, which reduce a management cost of a resource.

Further, since configuration definition of a resource is described in the XML-based text, the definition information is unified through the entire system, which eases a grasp of the configuration of the entire system even if the system employs a plurality of resource managers.

Still further, when the resource information is managed with separating into the physical information and the logic information, the operation side can manage/control the resource according to the logic information, which enables a resource management without the physical restriction, increasing the portability of the resource. Yet further, when the logic control keys link to the actual call interfaces, the resources can be controlled by a common instruction that is independent of the control methods (call interfaces) of the respective resources.

DESCRIPTION OF THE ACCOMPANYING DRAWINGS

FIGS. 2, 3 and 4 are lists of XML files used in the resource management method of the embodiment;

DESCRIPTION OF THE PREFERRED EMBODIMENTS

The resource management method and device of an embodiment according to the present invention will be described with reference to the drawings.

[System Configuration]

Figure 1:
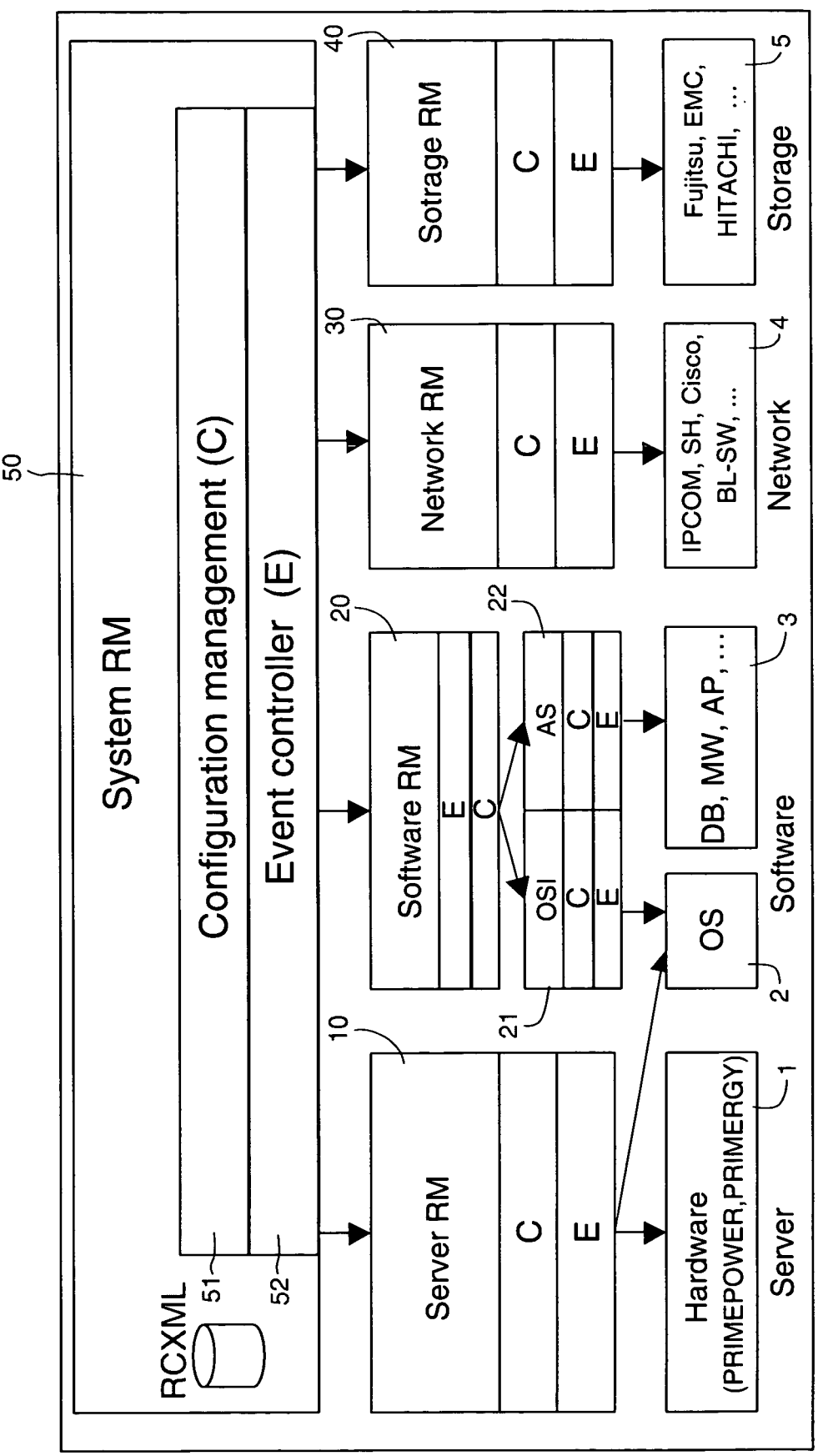
FIG. 1 is a block diagram showing a computer system on which the resource management method of the present invention is executed.

First, a general configuration of the computer system to which the resource management method and device of the embodiment are applied will be described based on FIG. 1. The computer system of FIG. 1 consists of a hardware resource 1 such as a server, a software resource including an OS (Operating System) resource 2 and a program resource 3 such as DB (Database), MW (Middle Ware) and AP (Application), a network resource 4 such as IP-COM, SH, Cisco, and BL-SW, and a storage resource 5 of a plurality of standards made by various companies such as Fujitsu, EMC and HITACHI. The hardware resource 1 is managed by a server resource manager (server RM) 10 that manages the server as hardware. The OS resource 2 is managed by a software resource manager (software RM) 20 that manages the software through an OSI (One-Shot Installer) 21 and the program resource 3 is managed by the software RM 20 through an AS (Application Service) 22. The network resource 4 is managed by a network resource manager (network RM) 30 and the storage resource 5 is managed by a storage resource manager (storage RM) 40.

Further, there is a system resource manager (system RM) 50 above these resource managers 10 through 40, and the system RM 50 is provided with a configuration management 51 and an event controller 52. Each of the low-end resource managers other than the system RM is also provided with a configuration management C and an event controller E.

A resource manager means a manager that manages resources that constitute the system or software that manages a resource manager. Further, a configuration management means a function to manage a configuration definition of a resource that is defined by an XML-based text. In the embodiment, the configuration management of the system RM has functions to convert operations by a user into an event list as a specific resource control instruction and to deliver the instruction to the event controller. Further, the configuration management of the system RM grasps the system configuration based on the definition information (RCXML) described in the XML-based text and knows control methods of the respective resources by the logic control mechanism of the RCXML. The configuration managements of the resource managers other than the system RM convert the event into resource original control interface defined for every resource and deliver it to the event controller. Further, the event controller processes the event delivered by the configuration management or the resource original control interface. In the embodiment, the event controller of the system RM sends the events to the respective resource managers, and the event controllers of the resource managers other than the system RM call the respective resource original control interface to control the respective resources.

In addition, the "operation" means an operation instruction informed from a user to the system RM, the "event" means a resource control instruction send from the event controller of the system RM to the respective resource managers. Further, the "resource original control interface" means a resource control instruction of the resource original interface by which the event controllers of the respective resource managers control the target resources.

With the above construction, when the system RM 50 receives the operating instructions (operations) to the respective resources, the configuration management 51 specifies the resources that require control and the event controller 52 sends the events to the respective resource managers that manage the target resources. When the low-end resource managers receive the events, the configuration management C specifies the resources that require control and the event controller E sends the control instructions to the target resources to operate the resources.

<Management Concept>

Next, a management concept of the resource management method according to the embodiment will be described as a premise of the above-described system.

1) Target hardware/software to be managed is commonly managed as a logic resource instead of a physical resource (define a resource in a logical format).

The information about the resource is managed by the physical information and the logic information linked to the physical information. In addition, the "physical resource" means an actual resource (physical hardware or software) that consists of the system, and the "logic resource" is created by virtualizing the physical resource or grouping the physical resources by the type. Since perspectives of physical resources vary from one resource manager to another, each resource manager keeps the information by the logic resource in its best mode and obtains the relationship among the resource managers based on the link information to the physical resource. The resource manager operates the logic resource. The physical information and the logic information are the information about the physical resource and the information about the logic resource, respectively.

2) The control method for the resource is managed logically.

The resources are managed by three control keys including a "Start" key, a "Stop" key and a "Configure" key (define the control method in a logical format). The "Start" key means a start-up of a resource (a start-up of software, turning the power on of hardware, for example), the "Stop" key means a stop of a resource (a stop of software, turning the power off of hardware, for example) and the "Configure" key means installation, addition or change of a resource (installation/addition of a server, additional installation of an application, for example).

<Provisioning Feature>

Further, functions provided by the resource management method of the embodiment will be described as follows.

3) Logic control mechanism, which defines the relationships between the control methods defined in a logical format (three control keys) and the actual call interface as the XML-based control definition information (RCXML), is provided to enable the resource control that is independent of the control methods (call interfaces) of the respective management targets. That is, the control methods to the respective control keys are defined as <Actions> factors and the respective control methods (URL) and a control key (type) are defined as <Action> factors for the respective physical resources. FIG. 2 shows an example of the corresponding definition between the logic keys described in the RCXML and the actual call interfaces. The control methods corresponding to the three control keys are defined on lines 6 though 9 of the list.

4) Logic resource information that links to the physical resource is defined by the XML-based configuration management mechanism and the resource configuration is changed by the change of the logic information. That is, physical information of the resource is defined by the <Components> schema of the RCXML and logic information is defined by the <Logical Views> schema. The physical information and the logic information of the resource are linked by designating a value of <id> of the physical information in the <LinkId> factor of the <Logical Views> schema as the logic information. Addition, change and deletion of the resource are carried out by adding, changing or deleting the resource definitions defined in the <Logical Views> schema. FIG. 3 shows an example of the corresponding definition between the logic information and the physical information of the resource described in the RCXML. The server id "psvr001" defined on line 3 as the physical resource links to the server id "LP001" of the logic resource on line 2 of the <Logical Views> schema.

Next, two actual implementation examples will be described on the precondition of the above configuration.

IMPLEMENTATION EXAMPLE 1

In the implementation example 1, the process to install new software A to an existing computer system will be described. FIG. 4 shows a description example in the XML of the implementation example 1. The system RM detects the addition of the software resource on the RCXML by the configuration management and recognizes that it is necessary to instruct installation and start-up of the software to the software RM (0-1). Further, the logic control mechanism recognizes the call interface to control the resource at the time of the addition (control key: Configure and Start) of the resource (0-2).

Figure 5:
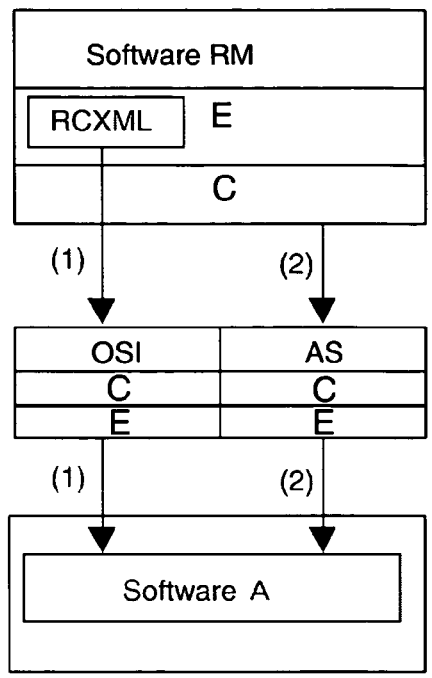
FIG. 5 is a block diagram showing a process to add software by the resource management method of the embodiment.

Then, the system RM sends the resource control instruction to the software RM in the order of "Configure" and "Start" as described below. FIG. 5 shows a process by the software RM and the lower portion when the software RM receives the instruction from the system RM.

(1) The software RM accepts the Configure instruction from the system RM and instructs installation of software to OSI 21. The OSI 21 installs the software to the server. Then the OSI 21 calls configuration setting that is necessary to start-up the software and executes it by the method designated in the interface (execution of "/mgr/app1/setappconf.sh").

(2) Subsequently, receiving the software start-up instruction from the system RM, the software RM instructs the AS22 to start-up the software. The AS22 starts up the software with the call interface (execution of "/mgr/app1/start.sh") designated by the resource control key (type="Start").

Figure 6:
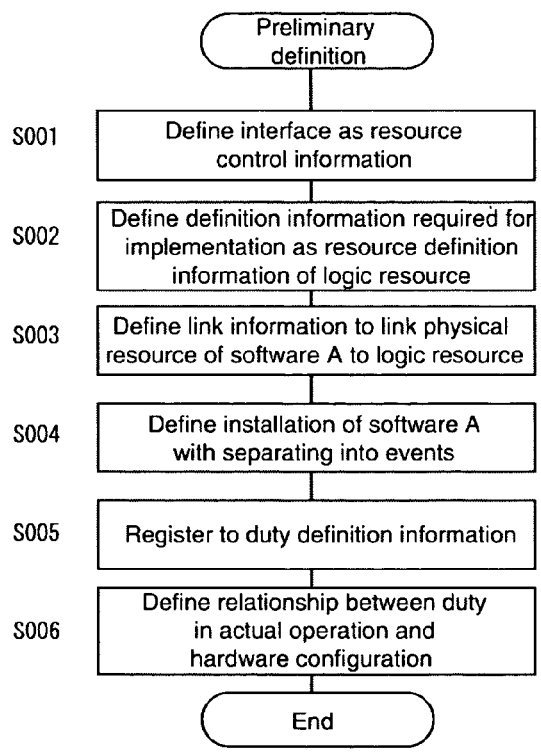
FIG. 6 is a flowchart showing a process of a preliminary definition when software is added by the resource management method of the embodiment.
Figure 7:
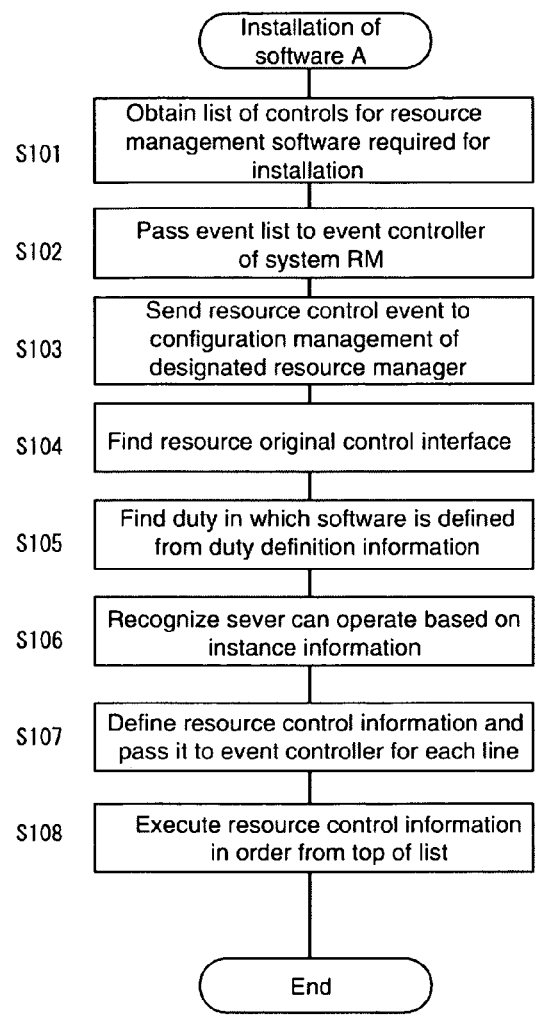
FIG. 7 is a flowchart showing a process to add software the resource management method of the embodiment.

The process of the implementation example 1 will be described more specifically using flowcharts of FIG. 6 and FIG. 7. In the following process, the preliminary definition is executed before installing the software and the software is installed based on the definition. FIG. 6 shows the process of the preliminary definition, and FIG. 7 shows the process for installing the software.

<Preliminary Definition>

The interface, which is called at the time of "start", "stop" or "install/configure" of the "mw01" provided by the vendor of the software specified by the resource identifier "mw01", is defined as resource control information as shown in Table 1 (S001). That is, the resource original control interface to control the "mw01" is mapped into control keys of three types. The "start" control key is implemented by calling "/mgr/app1/start.sh". The "stop" control key is implemented by calling "/mgr/app1/stop.sh". The "install/configure" control key is realized by calling "/mgr/app1/setappconf.sh". The control for the actual resource is implemented by combining the above-described processes. In addition, the resources represented by the identifier other than "mw01" are used in an implementation example 2 described below.

TABLE 1

Resource control information

| Resource identifier | Call I/F of start | Call I/F of Stop | Call I/F of configure |
|---|---|---|---|
| mw01 | /mgr/appl/start.sh | /mgr/appl/stop.sh | /mgr/appl/setappconf.sh |
| pw01 | /pwmgr/start | /pwmgr/stop | /pwmgr/setpw |
| stor01 | /stormgr/start | /stormgr/stop | /stormgr/setstor |
| os01 | /osmgr/startup | /osmgr/shutdown | /osmgr/setup |
| middle01 | /mwmgr/start | /mwmgr/stop | /mwmgr/setmw |
| ipcom01 | /netrm/start | /netrm/stop | /netrm/netconf |

Next, the definition information (a destination to be installed, tuning parameters, or the like) shown in Table 2 that is necessary to implement the "mw01" is defined as a resource definition information of the logic resource "logical_mw01" of the resource "mw01" (S002).

TABLE 2

Resource definition information

| Resource identifier | Parameter | Value |
|---|---|---|
| logical_mw01 | Destination to be installed | /opt |
|  | Tuning parameter 1 | 10000 |
|  | Tuning parameter 2 | "on" |
|  | : | : |
| logical_pw01 | Computer name | Host A |
|  | Number of used CPU | 2 |
|  | : | : |
| logical_stor01 | Bus number | 2 |
|  | Disk number | 256 |
|  | : | : |
| logical_os01 | IP address | 10.132.60.11 |
|  | Language/Locale | Japanese |
|  | : | : |
| logical_middle01 | Tuning parameter 101 | "on" |
|  | Tuning parameter 2 | 10 |
|  | : | : |
| logical_ipcom01 | IP address | 10.132.60.60 |
|  | Network address | 10.132.60.0 |
|  | : | : |

Subsequently, link information that links the physical resource "mw01" of the software A to the logic resource "logical_mw01" is defined as shown in FIG. 3 (S003).

TABLE 3

Link information between physical and logic resources

| Physical resource identifier | Logic resource identifier |
|---|---|
| mw01 | logical_mw01 |
| pw01 | logical_pw01 |
| stor01 | logical_stor01 |

TABLE 3-continued

Link information between physical and logic resources

| Physical resource identifier | Logic resource identifier |
|---|---|
| os01 | logical_os01 |
| middle01 | logical_middle01 |
| ipcom01 | logical_ipcom01 |

An installation of the software A is the operation "install the software A" from the viewpoint of a user, while the system RM executes the operation with separating the operation into the following events. This process is defined as an event list shown in Table 4 (creation of an event list for the respective resource managers corresponding to the user's operation, S004).

1) Instruct the software RM to install/configure the "logical_mw01".
2) Instruct the software RM to start the "logical_mw01".

TABLE 4

Event list information

| Operation target | Operation type | Resource identifier | RM type | Control type of resource (action) |
|---|---|---|---|---|
| Software A | Install | logical_mw01 | Soft | configure |
|  |  | logical_mw01 | Soft | start |
| Server B | Add | logical_pw01 | Server | Start |
|  |  | logical_stor1 | Storage | Configure |
|  |  | logical_os1 | Soft | Configure |
|  |  | logical_middle01 | Soft | Configure |
|  |  | logical_middle01 | Soft | Start |
|  |  | logical_ipcom01 | Network | Start |

Next, the resource "logical_mw01" is registered to the duty resource "service01" (registration to the duty definition information, S005).

TABLE 5

Duty definition information

| Duty resource identifier | Resource identifier of software necessary for duty |
|---|---|
| Service01 | logical_mw01 |
| Service02 | logical_os01 |
|  | logical_middle01 |

Finally, relationships between duties in an actual operation and the hardware configuration are defined (S006) Here, as shown in Table 6, duty resource "service01", the server resource "logical_server" and the storage resource "logical_storage" are defined in the instance information as a single instance.

TABLE 6

Instance information

| Duty resource identifier | Server resource identifier | Storage resource identifier | Network resource identifier |
|---|---|---|---|
| Service01 | logical_server | logical_storage | — |
| Service02 | logical_pw01 | logical_stor01 | logical_ipcom01 |

Next, the operations of the respective portions when software A is installed based on the above-described preliminary registration will be described.

<Operation>

The configuration management of the system RM obtains a list of controls (events) for the respective resource managers that are necessary to install the software A as shown in Table 7 based on the information defined in Table 4 (S101).

TABLE 7

Event list information required installing software A

| Operation target | Operation type | Resource identifier | RM type | Control type (action) of resource |
|---|---|---|---|---|
| Software A | Install | logical_mw01 | Soft | Configure |
|  |  | logical_mw01 | Soft | Start |

Subsequently, the configuration management of the system RM passes the event list (Table 7) to the event controller of the system RM (S102).

The event controller of the system RM sends the resource control events to the configuration managements of the respective resource managers specified by "RM type" in the event list (Table 7) received from the configuration management in the order from the top of the list (S103). Events for the same resource manager are sent in a mass. Here, the event list of Table 7 is sent to the software RM.

The configuration management of the software RM 20 finds the resource original control interface in response to the respective resource control types ("Configure" and "Start") in the event list shown in Table 7 according to the following process (S104).

(1) Find the physical resource identifier "mw01" corresponding to the logic resource identifier "logical_mw01" in FIG. 7 with reference to the physical resource and the logic resource link information in FIG. 3.

(2) Refer the resource control information in Table 1 and find the "Configure" call interface "/mgr/app1/setappconf.sh" and the "Start" call interface "/mgr/.app1/start.sh" in response to the software resource "mw01".

Subsequently, the configuration management of the software RM 20 finds the duty "service01" in which the software "logical_mw01" is defined from the duty definition information in Table 5 (S105), and recognizes that the "service01" operates on the server "logical_server" based on the instance information in Table 6 (S106). Then, the configuration management of the software RM 20 defines the resource original control interface including the software resource identifier "logical_mw01" of the control target, the server resource identifier "logical_server" and the control type ("Configure" or "Start") as resource control information shown in Table 8 and passes it to the event controller (S107) for each line (event) in Table 7.

TABLE 8

Resource control information executed by software RM to install software A

| Resource identifier | Server enable resource operation | Control type (action) of resource | Call interface |
|---|---|---|---|
| logical_mw01 | logical_server | Configure | /mgr/app1/setappconf.sh |
| logical_mw01 | logical_server | Start | /mgr/app1/start.sh |

The event controller of the software RM 20 executes the resource control information in Table 8 in the order from the top of the list (S108) and thereby the software A is installed and executed. Details will be described as follows.
(1) If the software "logical_mw01" is not installed on the server "logical_server", the software is installed.
(2) The resource control defined on line 1 is executed. That is, the resource definition information shown in FIG. 2 is referred and the call interface "/mgr/app1/setappconf.sh" configures the software "logical_mw01".
(3) The resource control defined on line 2 is executed. That is, the call interface "/mgr/app1/start.sh" starts the software "logical_mw01".

IMPLEMENTATION EXAMPLE 2

Figure 8:
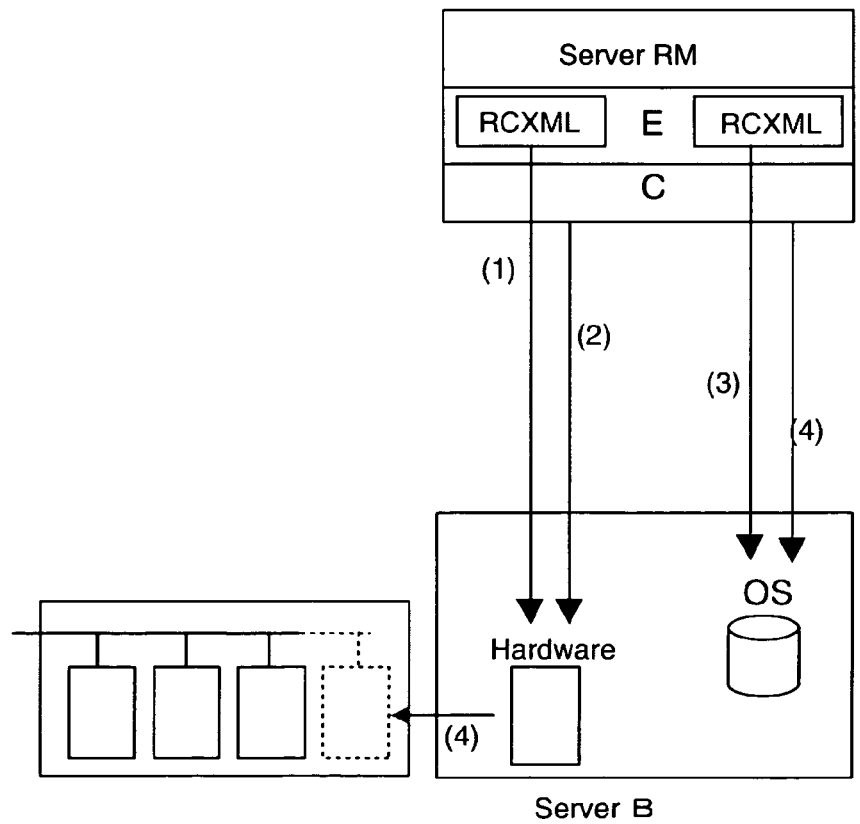
FIG. 8 is a block diagram showing a process to add server by the resource management method of the embodiment.

Next, the process to add a server B to the system will be described as an implementation example 2. FIG. 8 shows the process of the implementation example 2. In FIG. 8, it is assumed that the server consists of a hardware resource and an OS resource (while resources such as middleware, storage and network are required actually, two types of resources are shown in the interests of simplicity).
(1) Since there is no setting for starting the OS, the server must stop at the BIOS level of the hardware. The configuration management of the server RM instructs "Configure" to hardware resource based on configuration information (RCXML) of hardware resource so that the server stops at the BIOS level at the time of starting the hardware.
(2) The event controller of the server RM instructs "Start" (power ON) to the hardware resource. The server stops at the BIOS level according to the setting in (1).
(3) The configuration management of the server RM instructs "Configure" to the OS resource based on the configuration information (RCXML) of the OS resource to be started so that the information required for starting the OS (a computer name, for example) is set in the OS of the server.
(4) Subsequently, the event controller of the server RM instructs "Start" to the OS resource to boot the OS. After the OS starts, the server has been embedded in the system.

Figure 9:
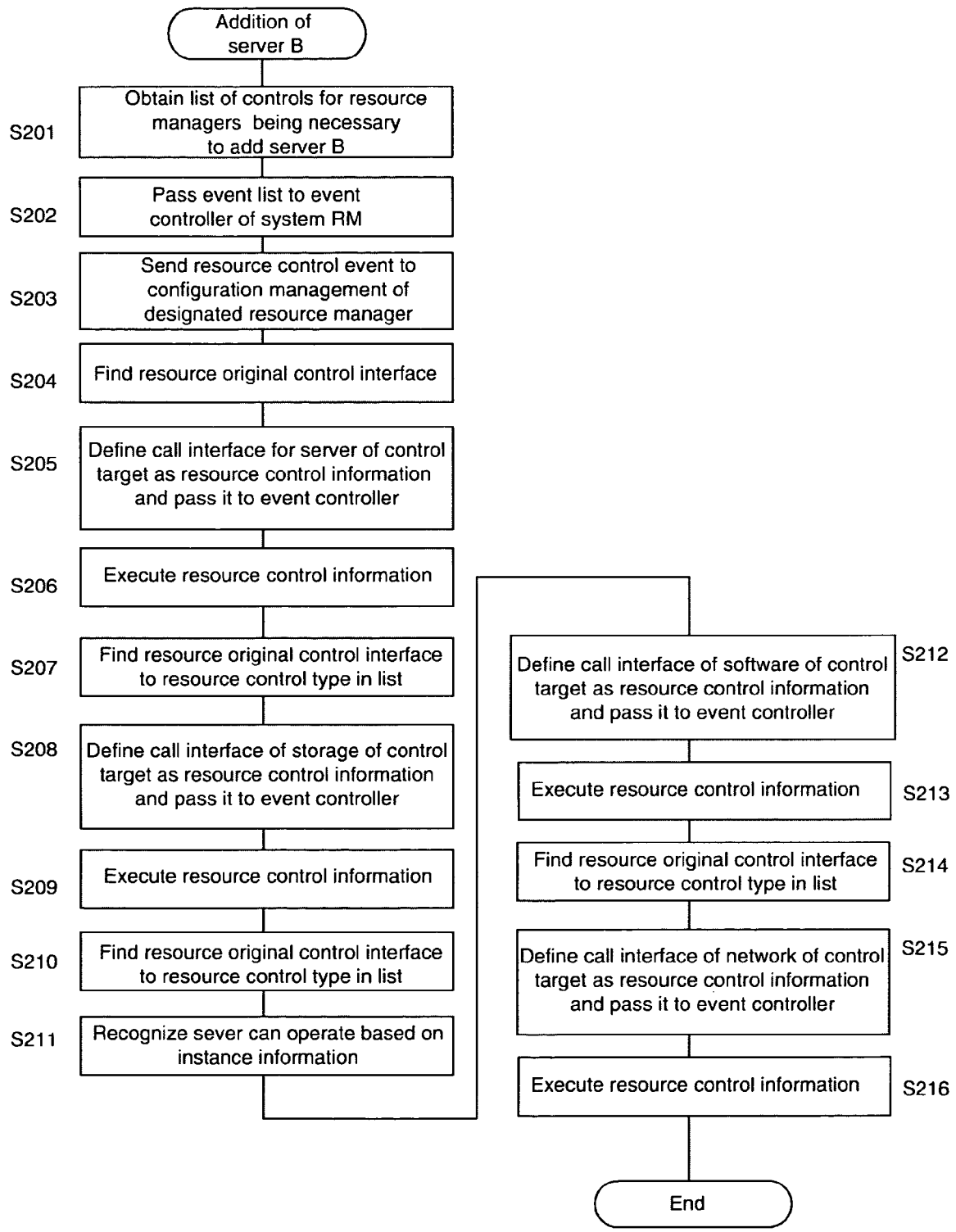
FIG. 9 is a flowchart showing a process to add server by the resource management method of the embodiment.

Details of the process in the implementation example 2 will be described using a flowchart in FIG. 9. In the following process, the preliminary definition is created before adding the server B and the server B is added based on the definition. Since the process of the preliminary definition is generally identical to that in the implementation example 1 shown in FIG. 6, a flowchart for the preliminary definition is omitted and the process to add the server is shown in FIG. 9.
<Preliminary Definition>
The interface, which is called at the time of "start", "stop" or "install/configure" of the respective resources provided by the vendors of hardware, storage, network and software (OS, MW) that constitute the server B, are defined as resource control information as shown in Table 1. The resource original control interface to control the server B is mapped into control keys of three types (S001). The specific contents are as follows. The control for the actual resource is implemented by combining the following processes.
Hardware "pw01"
 "Start" is implemented by calling "/pwmgr/start".
 "Stop" is implemented by calling "/pwmgr/stop".
 "Instal/Configure" is implemented by calling "/pwmgr/setpw".
Storage "stor01"
 "Start" is implemented by calling "/stormgr/start".
 "Stop" is implemented by calling "/stormgr/stop".
 "Instal/Configure" is implemented by calling "/stormgr/setstor".
Software (Operating system: OS) "os01"
 "Start" is implemented by calling "/osmgr/startup".
 "Stop" is implemented by calling "/osmgr/shutdown".
 "Instal/Configure" is implemented by calling "/osmgr/setup".
Software (middleware) "middle01"
 "Start" is implemented by calling "/mwmgr/start".
 "Stop" is implemented by calling "/mwmgr/stop".
 "Instal/Configure" is implemented by calling "/mwmgr/setmw".
Network "ipcom01"
 "Start" is implemented by calling "/netrm/start".
 "Stop" is implemented by calling "/netrm/stop".
 "Instal/Configure" is implemented by calling "/netrm/netconf".

The definition information (a destination of installation, tuning parameters or the like) that is necessary to implement the server B is defined as the resource definition information of the respective logic resources (the hardware "logical_pw01", the storage "logical_stor01", the operating system "logical_os01", the middleware "logical_middle01" and the network "logical_ipcom01") that constitute the server B as shown in Table 2 (S002).

Subsequently, the link information that links the respective physical resources ("pw01", "stor01", "os01", "middle01" and "ipcom01") constituting the server B to the logic resources ("logical_pw01", "logical_stor01", "logical_os01", "logical_middle01" and "logical_ipcom01") as shown in Table 3 is defined (S003).

An installation of the server B is the operation "add the server B" from the viewpoint of a user, while the system RM executes the operation with separating the operation into the following events. This process is defined as an event list shown in Table 4 (creation of an event list for the respective resource managers corresponding to the user's operation, S004).
1) Instruction for the server RM to start "logical_pw01".
2) Instruction for the server RM to configure "logical_stor01".
3) Instruction for the software RM to install and configure "logical_os01".
4) Instruction for the software RM to install and configure "logical_middle01".
5) Instruction for the software RM to start "logical_middle01".
6) Instruction for the network RM to start "logical_ipcom01".

Next, as shown in Table 5, the resources "logical_os01" and "logical_middle01" are registered to the duty "service02" (registration to duty definition information, S005) to define the relationship between the duty in the actual implementation and the hardware configuration (S006). Here, the duty resource "service02", the server resource "logical_pw01", the storage resource "logical_stor01" and the network resource "logical_ipcom01" are defined in the instance information as a single instance as shown in Table 6.

Next, the operations of the respective portions when the server B is added based on the above-described preliminary definition will be described.

<Operation>

The configuration management of the system RM obtains a list of controls (events) for the respective resource managers that are necessary to add the server B as shown Table 9 based on the information defined in Table 4 (S201).

TABLE 9

Event list information required adding server B

| Operation target | Operation type | Resource identifier | RM type | Control type (action) of resource |
|---|---|---|---|---|
| Server B | Add | logical_pw01 | Server | Start |
| | | logical_stor1 | Storage | Configure |
| | | logical_os1 | Soft | Configure |
| | | logical_middle01 | Soft | Configure |
| | | logical_middle01 | Soft | Start |
| | | logical_ipcom01 | Net | Start |

Subsequently, the configuration management of the system RM passes the event list (Table 9) to the event controller of the system RM (S202).

The event controller of the system RM sends the resource control events to the configuration managements of the respective resource managers specified by "RM type" in the event list (Table 9) received from the configuration management in the order from the top of the list (S203). Events for the same resource manager are sent in a mass. Here, the event list of Table 10 is sent to the server RM, the event list of Table 11 is sent to the storage RM, the event list of Table 12 is sent to the software RM and the event list of Table 13 is sent to the network RM.

TABLE 10

Event list information sent to server RM to add server B

| Operation target | Operation type | Resource identifier | RM type | Control type (action) of resource |
|---|---|---|---|---|
| Server B | Add | logical_pw01 | Server | Start |

TABLE 11

Event list information sent to storage RM to add server B

| Operation target | Operation type | Resource identifier | RM type | Control type (action) of resource |
|---|---|---|---|---|
| Server B | Add | logical_stor1 | Storage | Configure |

TABLE 12

Event list information sent to software RM to add server B

| Operation target | Operation type | Resource identifier | RM type | Control type (action) of resource |
|---|---|---|---|---|
| Server B | Add | logical_os01 | Soft | Configure |
| | | logical_middle01 | Soft | Configure |
| | | logical_middle01 | Soft | Start |

TABLE 13

Event list information sent to network RM to add server B

| Operation target | Operation type | Resource identifier | RM type | Control type (action) of resource |
|---|---|---|---|---|
| Server B | Add | logical_ipcom01 | Net | Start |

Hereinafter, the operation flow in the respective resource manager (RM) will be described.

The configuration management of the server RM finds the resource original control interface in response to the respective resource control types "Start" in the event list shown in Table 10 according to the following process (S204).

(1) Refer the physical resource and the logic resource link information in Table 3 and find the physical resource identifier "pw01" corresponding to the logic resource identifier "logical_pw01" in Table 10.

(2) Refer the resource control information in Table 1 and find the call interface "/pwmgr/start" of the control type "Start" corresponding to the software "pw01".

Then, the configuration management of the server RM defines the server resource identifier "logical_pw01" of the control target and the call interface (the resource original control interface) "/pwmgr/start" of the control type "Start" about the event in Table 10 as the resource control information as shown in Table 14, and passes them to the event controller (S205).

TABLE 14

Resource control information executed by server RM to add server B

| Resource identifier | Control type (action) of resource | Call interface |
|---|---|---|
| logical_pw01 | Start | /pwmgr/start |

The event controller of the server RM executes resource control information in Table 14 (S206). Specifically, the resource control defined on line 1 is executed. That is, the server "logical_pw01" is started by the call interface "/pwmgr/start".

The configuration management of the storage RM finds the resource original control interface of the resource whose control type is "Configure" in the event list of Table 11 according to the following process (S207).

(1) Refer the physical resource and the logic resource link information in Table 3 and find the physical resource identifier "stor01" corresponding to the logic resource identifier "logical_stor01" in Table 11.

(2) Refer the resource control information in Table 1 and find the call interface "/stormgr/setstor" of the control type "Configure" corresponding to the storage "stor01".

Subsequently, the configuration management of the storage RM defines the storage resource identifier "logical_stor01" of the control target and the resource original control interface (call interface) of the control type "Configure" about the event in Table 11 as the resource control information as shown in Table 15, and passes them to the event controller (S208).

TABLE 15

Resource control information executed by storage RM to add server B

| Resource identifier | Control type (action) of resource | Call interface |
|---|---|---|
| logical_stor01 | Configure | /stormgr/setstor |

The event controller of the storage RM executes the resource control information in Table 15 (S209). Specifically, the resource control defined on line 1 is executed. That is, the event controller refers the resource definition information in Table 2 and configures the storage "logical_stor01" based on the call interface "/stormgr/setstor".

The configuration management of the software RM finds the resource original control interface corresponding to the control types ("Configure" and "Start") of the respective resources ("logical_os01" and "logical_middle01") in the event list in Table 12 according to the following process (S210).
(1) Refer the physical resource and the logic resource link information in Table 3 and find the physical resource identifiers "os01" and "middle01" corresponding to the logic resource identifiers "logical_os01" and "logical_middle01" in Table 11.
(2) Refer the resource control information in Table 1 and find the call interface "/osmgr/setup" of the control type "Configure" corresponding to the software "os01". In the same manner, find the call interface "/mwmgr/setmw" of the control type "Configure" and the call interface "/mwmgr/start" of the control type "Start" corresponding to the software "middle01".

Subsequently, the configuration management of the software RM finds the duty "service02" in which the software "logical_os01" and "logical_middle01" are defined based on the duty definition information in Table 5, and recognizes that the duty "service02" operates on the server "logical_pw01" based on the instance information in Table 6 (S211). Further, the configuration management of the software RM defines the software resource identifiers "logical_os01" and "logical_middle01" of the control target, the server resource identifier "logical_pw01" and the resource original control interfaces of the respective software resource identifiers of the respective control types ("Configure" and "Start") for each line (event) of Table 12 as the resource control information as shown in Table 16, and asses them to the event controller (S212).

TABLE 16

Resource control information executed by software RM to add server B

| Resource identifier | Server enable resource operation | Control type (action) of resource | Call interface |
|---|---|---|---|
| logical_os01 | logical_pw01 | Configure | /osmgr/setup |
| logical_middle01 | logical_pw01 | Configure | /mwmgr/setmw |
| logical_middle01 | logical_pw01 | Start | /mwmgr/start |

The event controller of the software RM executes the resource control information in Table 16 in the order from the top of the list (S213). Details will be described as follows.
(1) Refer the resource control list information in Table 16 and install the software "logical_os01" onto the server "logical_pw01" if it has not been installed.
(2) Execute the resource control defined on line 1. Refer the resource definition information in Table 2 and configure the software "logical_os01" with the call interface "/osmgr/setup".
(3) Refer the resource control list information in Table 16 and install the software "logical_middle01" onto the server "logical_pw01" if it has not been installed.
(4) Execute the resource control defined on line 2. Refer the resource definition information in Table 2 and configure the software "logical_ms01" with the call interface "/mwmgr/setmw".
(5) Execute the resource control defined on line 3. Start the software "logical_middle01" with the call interface "/mwmgr/start".

The configuration management of the network RM finds the resource original control interface corresponding to the resource control type "Start" in the event list of Table 13 according to the following process (S214).
(1) Refer the physical resource and the logic resource link information in Table 3 and find the physical resource identifier "ipcom01" corresponding to the logic resource identifier "logical_ipcom01" in Table 12.
(2) Refer the resource control information in Table 1 and find the call interface "/netrm/start" of the control type "Start" for the network device "ipcom01".

Subsequently, the configuration management of the network RM defines the network resource identifier "logical_ipcom01" of the control target and the resource original control interface of the control type "Start" (call interface) "/netrm/start" as the resource control information as shown in Table 17 for the event in Table 12, and delivers them to the event controller (S215).

TABLE 17

Resource control information executed by Network RM to add server B

| Resource identifier | Control type (action) of resource | Call interface |
|---|---|---|
| logical_ipcom01 | Start | /netrm/start |

The event controller of the network RM executes the resource control information shown in the table 17 (S216). Specifically, it executes the resource control defined in line 1. The call interface "/netrm/start" starts the network "logical_ipcom01". The above-described process adds the server B to the system and causes the activation thereof.

According to the resource management method of the embodiment, the addition of new hardware or software to the system requires the interface of the XML text only and does not require to update the programs of the resource manager. Therefore, new resource to be managed can be added as a subject to monitoring by the XML-based configuration definition that is provided with hardware or software without updating the resource manager.

Further, since the format of the configuration/control information about the resource is defined (formalization of information), it becomes unnecessary to amend the vendor's original definitions and control portions, which enables to manage and control the respective resources by the common information. Still further, since the resource information is managed with separating it into the physical information and the logic information, the operation side can manage/control the resource according to the logic information, which enables a resource management without the physical restriction, increasing the portability of the resource.

In addition, since the configuration definition of each resource is described in an XML-based text, the definition information is unified through the entire system, which eases a grasp of the configuration of the entire system even if the system employs a plurality of resource managers.

What is claimed is:

1. A resource management method comprising:
   first specifying, by a system resource manager, a target logical resource from a plurality of logical resources respectively linked to a plurality of physical resources, based on an operation request including at least one operation target and operation type, and event list information stored in the system resource manager, the event list information including relationships between operation targets, operation types, the plurality of logical resources, a plurality of resource managers and control types, the control types including "Start", "Stop", and "Configure", and the plurality of resource managers being accessible through the system resource manager;
   second specifying, by the system resource manager, at least one specific control type among the "Start", "Stop", and "Configure" based on the operation request and the event list information;
   sending, by the system resource manager, the at least one specific control type to a resource manager that controls the target logical resource;
   converting, by the resource manager, the at least one control type into at least one call interface of a target physical resource linked to the target logical resource based on control definition information, the control definition information including a relationship between the three control types and call interfaces to instruct the target physical resource to start, stop, and configure; and
   calling, by the resource manager, the at least one call interface to control the target physical resource.

2. A resource management device comprising:
   a memory; and
   a processor executing a system resource manager and a plurality of resource managers accessible through the system resource manager,
   wherein
   the system resource manager
   specifies a target logical resource from a plurality of logical resources respectively linked to a plurality of physical resources, based on a received operation request including at least one operation target and operation type and event list information stored in the memory, the event list information including relationships between operation targets, operation types, the plurality of logical resources, a plurality of resource managers and control types;
   specifies at least one specific control cede type among the "Start", "Stop", and "Configure" based on the operation request and the event list information; and
   sends the at least one specific control type to a resource manager that controls the target logical resource, and
   the resource manager converts the at least one control type into at least one call interface of a target physical resource linked to the target logical resource based on control definition information, the control definition information including a relationship between the three control types and call interfaces to instruct the target physical resource to start, stop, and configure; and
   calls the at least one command call interface to control the target physical resource.

3. A non-transitory storage medium recording a resource management program for causing a processor to execute a system resource manager and a plurality of resource managers accessible through the system resource manager, the program comprising:
   first specifying, by the system resource manager, a target logical resource from a plurality of logical resources respectively linked to a plurality of physical resources, based on an operation request including at least one operation target and operation type, and event list information stored in the system resource manager, the event list information including relationships between operation targets, operation types, the plurality of logical resources, the plurality of resource managers and control types, the control types including "Start", "Stop", and "Configure";
   second specifying, by the system resource manager, at least one specific control type among the "Start", "Stop", and "Configure" based on the operation request and the event list information; and
   sending, by the system resource manager, the at least one specific control type to a resource manager that controls the target logical resource,
   converting, by the resource manager, the at least one control type into at least one call interface of a target physical resource linked to the target logical resource based on control definition information, the control definition information including a relationship between the three control types and call interfaces to instruct the target physical resource to start, stop, and configure; and
   calling, by the resource manager, the at least one call interface to control the target physical resource.

4. The resource management method according to claim 1, wherein the information of the plurality of logical resources respectively linked to the plurality of physical resources and the control definition information are described in XML-based text.

* * * * *

UNITED STATES PATENT AND TRADEMARK OFFICE
CERTIFICATE OF CORRECTION

PATENT NO.      : 8,732,715 B2
APPLICATION NO. : 10/996839
DATED           : May 20, 2014
INVENTOR(S)     : Yazawa et al.

It is certified that error appears in the above-identified patent and that said Letters Patent is hereby corrected as shown below:

In the Claims:

Col. 16, line 12, claim 2, delete "cede".

Col. 16, line 24, claim 3, delete "command".

Signed and Sealed this
Sixth Day of January, 2015

Michelle K. Lee
*Deputy Director of the United States Patent and Trademark Office*